(12) United States Patent
Sawada

(10) Patent No.: US 11,659,417 B2
(45) Date of Patent: May 23, 2023

(54) COMMUNICATION APPARATUS, METHOD FOR CONTROLLING THE SAME, AND STORAGE MEDIUM

(71) Applicant: CANON KABUSHIKI KAISHA, Tokyo (JP)

(72) Inventor: Tetsuya Sawada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/315,155

(22) Filed: May 7, 2021

(65) Prior Publication Data
US 2021/0352498 A1  Nov. 11, 2021

(30) Foreign Application Priority Data
May 11, 2020 (JP) .............................. JP2020-083384

(51) Int. Cl.
*H04W 24/04* (2009.01)
*H04L 41/082* (2022.01)

(52) U.S. Cl.
CPC ........... *H04W 24/04* (2013.01); *H04L 41/082* (2013.01)

(58) Field of Classification Search
CPC ....... H04L 12/28; H04L 41/082; H04W 24/04
USPC ......................................................... 370/329
See application file for complete search history.

(56) References Cited

U.S. PATENT DOCUMENTS

2010/0217837 A1* 8/2010 Ansari ............... H04L 12/2814
                                                        709/224
2019/0297671 A1* 9/2019 Perdomo .................. G06F 8/65

FOREIGN PATENT DOCUMENTS

JP        2017038126 A      2/2017

* cited by examiner

*Primary Examiner* — Dang T Ton
(74) *Attorney, Agent, or Firm* — Canon U.S.A., Inc. IP Division

(57) ABSTRACT

A communication apparatus to function as an access point in a wireless network including a plurality of access points includes an acquisition unit configured to acquire information about firmware of at least one access point other than the communication apparatus of the plurality of access points, a determination unit configured to determine a schedule for updating the firmware of the at least one access point based on the acquired firmware information, and a notification unit configured to notify the at least one access point of information about the determined schedule.

18 Claims, 15 Drawing Sheets

COMMUNICATION APPARATUS, METHOD FOR CONTROLLING THE SAME, AND STORAGE MEDIUM

BACKGROUND

Field

The present disclosure relates to a communication apparatus that functions as an access point in a wireless network.

Description of the Related Art

The Wi-Fi EasyMesh® standard devised by Wi-Fi Alliance prescribes various types of control in a network including multiple access points (hereinafter also referred to as "APs"). Such a network with multiple APs linked to one another is hereinafter referred to as a "multi-AP network".

According to the Wi-Fi EasyMesh® standard, each AP that forms a multi-AP network is able to acquire various types of information from other APs to implement efficient network control between multiple APs using the information.

APs that are included in a multi-AP network function as either a Multi-AP Controller (hereinafter referred to as a "controller") or a Multi-AP Agent (hereinafter referred to as an "agent").

A controller is an AP that acquires various types of information about APs in the multi-AP network and stations (hereinafter referred to as "STAs") connected to the APs from agents to perform efficient network control between multi APs with the acquired information. An agent is an AP that is under the management of a controller and notifies the controller of various types of network information.

The functionality of a controller may be performed by an AP or a control apparatus in the multi-AP network. One AP may perform the functionalities of both a controller and an agent.

Agents notify their controller of network information via the protocol prescribed by the Institute of Electrical and Electronics Engineers (IEEE) 1905.1 standard, and the controller issues instructions to the agents to control the multi-AP network. The network information notified to the controller by the agents includes topology information and discovery information about the network.

The controller performs proxy control and data traffic management in data communication between the multi-AP network and public networks.

Japanese Patent Application Laid-Open No. 2017-038126 discusses a connection control apparatus used in a network with a plurality of APs. The connection control apparatus switches between the APs to connect one to wireless terminals to distribute the communication load on the APs. More specifically, Japanese Patent Application Laid-Open No. 2017-038126 discusses a technique as follows. The connection control apparatus acquires information about the communication load on the APs. If an AP is overloaded based on the communication load information, the connection control apparatus determines a disconnection target terminal from among a plurality of STAs connected to the overloaded AP. Then, the connection control apparatus transmits an instruction for inhibiting connection to the disconnection target terminal to the APs other than a switch target terminal connectable to a connection target terminal. After the transmission of the connection inhibition instruction, the connection control apparatus transmits an instruction for disconnecting the disconnection target terminal to the overloaded AP.

It is suitable that all the APs that form a multi-AP network have the latest firmware for security and interconnectivity. Otherwise, for example, a vulnerable AP in the multi-AP network could undermine the security of the entire multi-AP network. In addition, an AP with an earlier version firmware in the multi-AP network could adversely affect the multi-AP network control, disturbing the expected management of the multi-AP network.

On the other hand, unplanned firmware updates on each AP are unsuitable for the topology control of a multi-AP network, which is a mesh type network in which each AP connects to a large number of connection destinations. Otherwise, for example, an unplanned update of the firmware of an AP connecting to other APs or connecting to many STAs could cause a large-scale communication breakdown.

SUMMARY

Various embodiments of the present disclosure provide, in a wireless network including a plurality of access points, a communication apparatus to suitably update the firmware of the plurality of access points.

According to one embodiment, a communication apparatus to function as an access point in a wireless network including a plurality of access points includes an acquisition unit configured to acquire information about firmware of at least one access point other than the communication apparatus of the plurality of access points, a determination unit configured to determine a schedule for updating the firmware of the at least one access point based on the acquired firmware information, and a notification unit configured to notify the at least one access point of information about the determined schedule.

Further features will become apparent from the following description of exemplary embodiments with reference to the attached drawings.

DESCRIPTION OF THE EMBODIMENTS

Exemplary embodiments will be described in detail below with reference to the accompanying drawings. It should be understood that the following exemplary embodiments are illustrative examples for implementing various embodiments of the present disclosure, and may be corrected and modified as appropriate depending on the configuration of an apparatus according to the various embodiments of the present disclosure and other various conditions. The present invention is not limited to the following exemplary embodiments. Not all of the combinations of the features described in the present exemplary embodiments are used to the solution for the present invention.

Examples will be described where communication apparatuses conform to the Wi-Fi EasyMesh® standard, which accommodates a multi-AP network including a plurality of access points (APs), but the following exemplary embodiments are not limited thereto. For example, a communication apparatus may use other communication methods that enable wireless communication in a multi-AP network including a plurality of APs. In addition, the Wi-Fi EasyMesh® standard conforms to the specifications as "Multi-AP Specification Version 1.0" and the following specifications published by Wi-Fi Alliance.

<Network Configuration According to A First Exemplary Embodiment>

According to a first exemplary embodiment, an access point (AP) operating as a controller adjusts the schedule for updating the firmware of the other APs operating as agents, and notifies the other APs of information about the adjusted schedule.

The firmware to be updated according to the present exemplary embodiment is software for controlling the hardware of a communication apparatus. The communication apparatus typically has a nonvolatile storage device in which the software is installed in advance. The firmware may include micro codes and a Basic Input/Output System (BIOS) that determine the operations of the Central Processing Unit (CPU) included in the communication apparatus.

Figure 1:
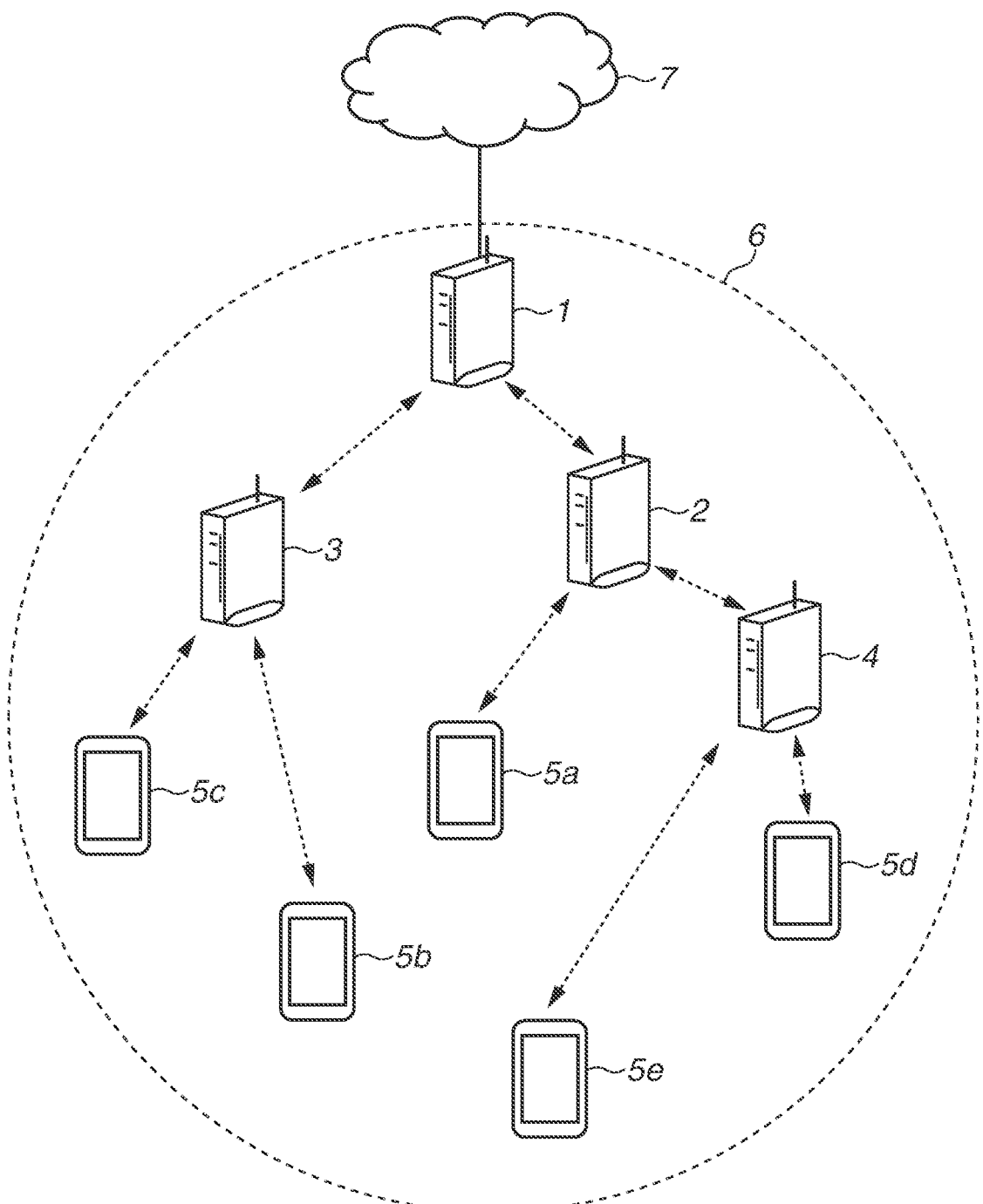
FIG. 1 illustrates an example of a network configuration of a communication system according to a first exemplary embodiment.

FIG. 1 illustrates an example of a network configuration of a communication system according to the present exemplary embodiment.

The communication system illustrated in FIG. 1 includes communication apparatuses 1 to 5 connected in a multi-AP network 6 including them as APs, and performs wireless communication in the multi-AP network 6.

Each of the communication apparatuses 1 to 4 functions as an AP, all of which constitutes a wireless Local Area Network (LAN) conforming to the Institute of Electrical and Electronics Engineers (IEEE) 802.11 series standard. On the other hand, communication apparatuses 5a to 5e function as stations (STAs) connected to the wireless LAN including the communication apparatuses 2, 3, and 4 as APs. Hereinafter the communication apparatuses 1 to 4 are also referred to as APs 1 to 4, respectively, and the communication apparatus 5a to 5e are also referred to as STAs 5a to 5e, respectively.

The AP 1 is included in the wireless LAN network and connects to the other APs 2 and 3. The APs 2 and 3 are connected to the AP 1 in the wireless LAN network as an STA through back-haul communication relaying access lines and the core network. The AP 4 is connected to the AP 2 as an STA under the AP 2 in the wireless LAN network through back haul communication, and is controlled by the AP1 as the controller via the AP2.

The APs 1 to 4 are mere communication apparatuses provided with the access point functionality, and may not be dedicated devices that provide access points.

Referring to FIG. 1, the AP 1 is connected to a Wide Area Network (WAN) 7 and functions as a gateway to relay communications with the other APs 2 to 4 and the STAs 5a to 5e to connect communications to the WAN 7. Instead of the AP 1, any of the APs 2 to 4 may function as a gateway. In some embodiments, the APs 1 to 4 perform wired communications in addition to or instead of wireless communications.

The Wi-Fi EasyMesh® standard accommodates one multi-AP network including one controller and a plurality of agents.

In FIG. 1, the AP 1 plays a role of a controller with the functionality of controlling the entire multi-AP network 6 by controlling the other APs in it. On the other hand, the other APs 2 to 4, which do not play a role of a controller, each play a role of an agent with the functionality to notify the controller of network information under the management of the controller.

In FIG. 1, the STA 5a is connected to the AP 2 via a wireless LAN through front-haul communication that connects master and slave stations. Likewise, the STAs 5b and 5c are connected to the AP 3, and the STAs 5d and 5e are connected to the AP 4 via a wireless LAN based on front-haul communication.

In FIG. 1, the multi-AP network 6 is a wireless LAN network conforming to the Wi-Fi EasyMesh® and IEEE802.11 standards. The multi-AP network 6 includes the AP 1 as the controller AP with the APs 2 to 4 as the agent APs. The Wi-Fi EasyMesh® and IEEE802.11 standards are examples. Alternatively, other standards with the similar functionality may be employed.

The multi-AP network 6 may be a network conforming to wireless Universal Serial Bus (USB), MultiBand OFDM Alliance (MBOA), or Bluetooth (registered trademark). The multi-AP network 6 may be a network conforming to Ultra Wide Band (UWB), ZigBee (registered trademark), or Near Field Communication (NFC). UWB includes wireless USB, wireless 1394, and WINET.

The APs 1 to 4 illustrated in FIG. 1 each are a communication apparatus to function as an AP conforming to the Wi-Fi EasyMesh® standard and have a hardware functional configuration that will be described below with reference to in FIGS. 2 and 3. Although the APs 1 to 4 may be, for example, wireless LAN routers, personal computers (PCs), tablet terminals, smartphones, televisions, printers, copiers, or projectors, the present invention is not limited thereto. The APs 1 to 4 may be different types of devices from one another. Likewise, the STAs 5*a* to 5*e* illustrated in FIG. 1 may each be a communication apparatus of any device type to function as an STA conforming to the Wi-Fi EasyMesh® standard.

<Hardware and Function Configuration of Communication Apparatus>

Figure 2:
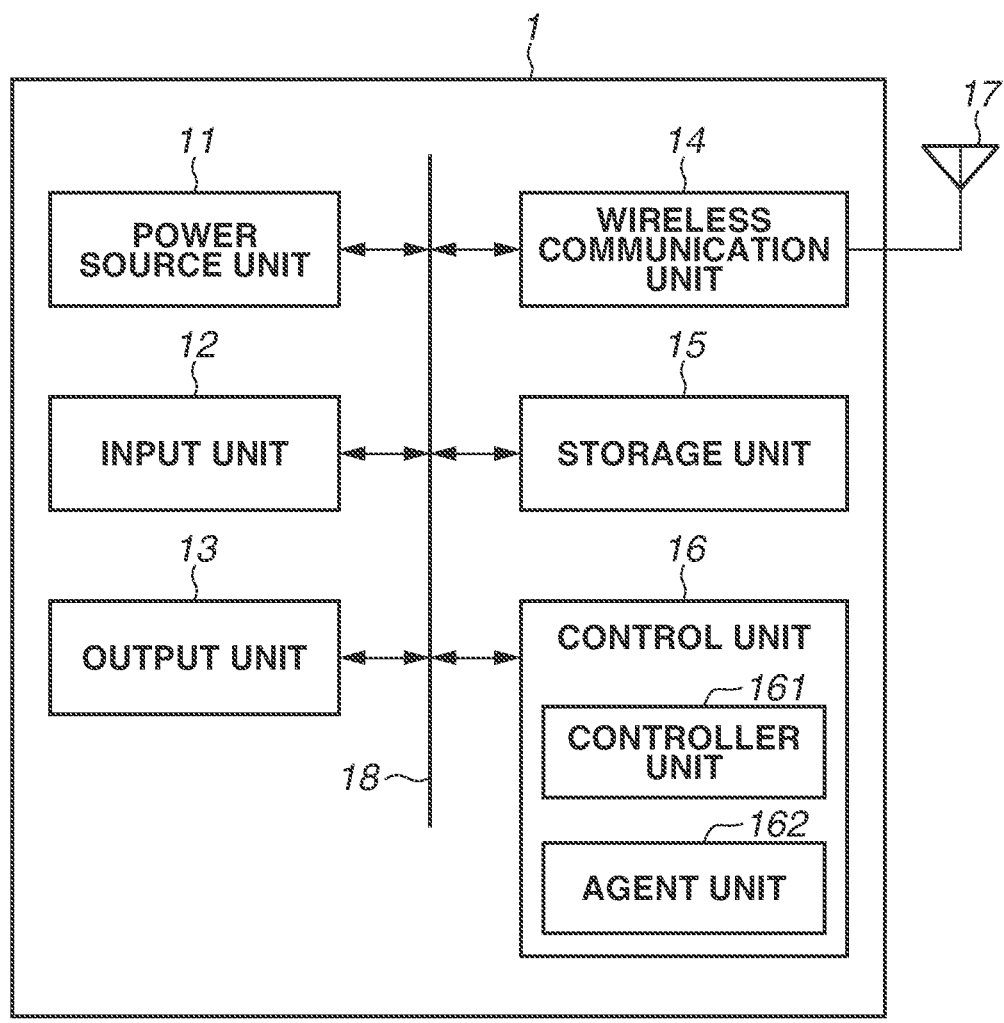
FIG. 2 is a block diagram illustrating an example of a hardware functional configuration of a communication apparatus (controller) according to the first exemplary embodiment.

FIG. 2 illustrates an example of a hardware functional configuration of a communication apparatus that functions as a controller according to the present exemplary embodiment. The AP 1 of FIG. 1 will be described as a communication apparatus having the hardware functional configuration illustrated in FIG. 2, but the APs 2 to 4 may also have the hardware functional configuration illustrated in FIG. 2.

The AP that plays the role of a controller may have the functionality of an agent together. In the present exemplary embodiment, an example will be described where the AP 1 illustrated in FIG. 1 has the functionalities of both a controller and an agent while the APs 2 to 4 have only the functionality of an agent. However, the present exemplary embodiment is not limited thereto. Any of the APs 1 to 4 illustrated in FIG. 1 may have the functionalities of both a controller and an agent, or have only the functionality of either a controller or an agent.

The communication apparatus 1 (AP 1) illustrated in FIG. 2 includes a power source unit 11, an input unit 12, an output unit 13, a wireless communication unit 14, a storage unit 15, a control unit 16, and an antenna 17.

The components of the AP 1 illustrated in FIG. 2 are communicably connected to one another via a system bus 18. The AP 1 may be composed of a part of the above-described modules or include an additional module added to the configuration illustrated in FIG. 2.

The power source unit 11 supplies power to the hardware components of the AP 1. For example, the power source unit 11 may acquire power from an alternating current (AC) power source or a battery.

The input unit 12 receives various types of operations from the user via a pointing device such as a mouse, a voice input, or a button operation.

The output unit 13 outputs various types of data to the user. The output by the output unit 13 may include at least one of Light Emitting Diode (LED) display, screen display, output from a speaker, or vibration output. Alternatively, the input unit 12 and the output unit 13 may be integrated as one module, such as a touch panel.

The wireless communication unit 14 controls a wireless LAN conforming to the IEEE802.11 series standard as a protocol of the physical and data link layers, and controls wired communications such as a wired LAN conforming to the IEEE802.3 standard. The wireless communication unit 14 further controls Internet Protocol (IP) communications as a communication protocol of the network layer. The wireless communication unit 14 further controls a controller and/or agents according to the Wi-Fi EasyMesh® standard while controlling the antenna 17 to transmit and receive wireless signals in wireless communication.

The storage unit 15 includes one or more memories such as a Read Only Memory (ROM) and Random Access Memory (RAM) to store programs for performing various types of operations (described below) and information such as communication parameters for wireless communication. The storage unit 15 may include a memory such as the ROM or RAM or a storage medium such as a flexible disk, hard disk, optical disk, compact disc read only memory (CD-ROM), compact disc recordable (CD-R), magnetic tape, nonvolatile memory card, and digital versatile disc (DVD).

Programs stored in storage unit 15 include programs for performing controller control and agent control in a multi-AP network 6 conforming to the Wi-Fi EasyMesh® standard.

The firmware is stored in a nonvolatile memory such as a flash memory and a ROM in the storage unit 15. A ROM may be an Electrically Erasable Programmable ROM (EEPROM), which is rewritable without replacement, or an Erasable Programmable ROM (EPROM).

The control unit 16 includes one or more processors such as a Central Processing Unit (CPU) and a Micro Processing Unit (MPU). The control unit 16 integrally controls the entire AP 1 by running programs stored in the storage unit 15. The control unit 16 may control the entire AP 1 in collaboration with programs stored in the storage unit 15 and an Operating System (OS).

In the present exemplary embodiment, the control unit 16 includes a controller unit 161 and an agent unit 162. The controller unit 161 serves as a controller in the multi-AP network 6 by reading a program for performing controller control in the multi-AP network 6 from the storage unit 15 to run it. Likewise, the agent unit 162 functions as an agent in the multi-AP network 6 by reading a program for performing agent control in the multi-AP network 6 from the storage unit 15 to run it.

The AP 1 performs the functionality of at least either of a controller or an agent according to settings and operations on the AP 1. The control unit 16 separately enables or disables the functionality of a controller or an agent.

The AP 1 functioning as a controller of the multi-AP network 6 controls the multi-AP network 6 by issuing instructions to the agents based on topology information and discovery information about the network received from agents.

The AP1 serving as an agent of the multi-AP network 6 notifies the controller of network information such as topology information about the network.

The communication apparatus 1 under the condition of not playing the role of a controller may have no controller functionality. Likewise, the communication apparatus 1 under the condition of not playing the role of an agent may have no agent functionality.

Figure 3:
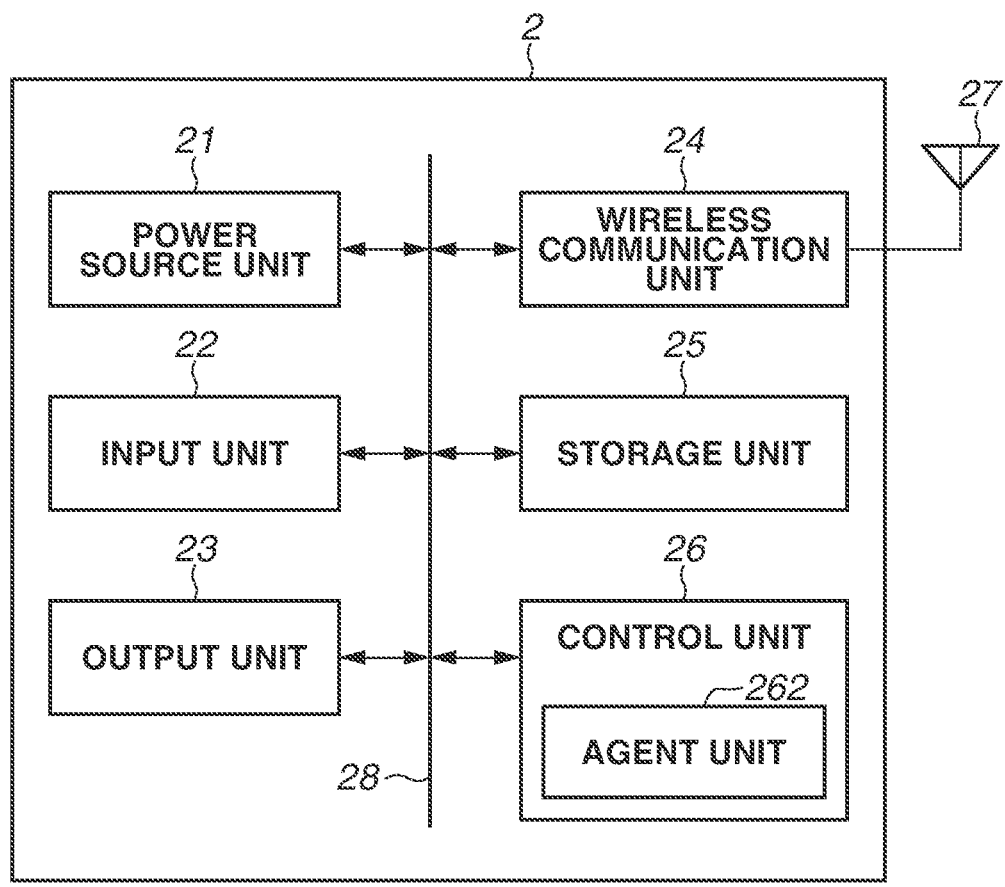
FIG. 3 is a block diagram illustrating an example of a hardware functional configuration of a communication apparatus (agent) according to the first exemplary embodiment.

FIG. 3 illustrates an example of a hardware functional configuration of a communication apparatus that functions as an agent according to the present exemplary embodiment. The AP 2 in FIG. 1 will be described as a communication apparatus having the hardware functional configuration illustrated in FIG. 3. The APs 3 and 4 may also have the same hardware functional configuration illustrated in FIG. 3.

The communication apparatus 2 (AP 2) illustrated in FIG. 3 includes a power source unit 21, an input unit 22, an output unit 23, a wireless communication unit 24, a storage unit 25, a control unit 26, and an antenna 27.

The components of the AP 2 illustrated in FIG. 3 are communicably connected to one another via a system bus 28. The AP 2 may be composed of a part of the above-described modules or include additional modules added to the configuration illustrated in FIG. 3.

The control unit 26 includes an agent unit 262 that operates the AP 2 as an agent. The components of the AP 2 illustrated in FIG. 3 have similar functions of the components of the AP 1 illustrated in FIG. 2 except that the control unit 26 does not include the controller unit.

<Firmware Update Management Processing>

Figure 4:
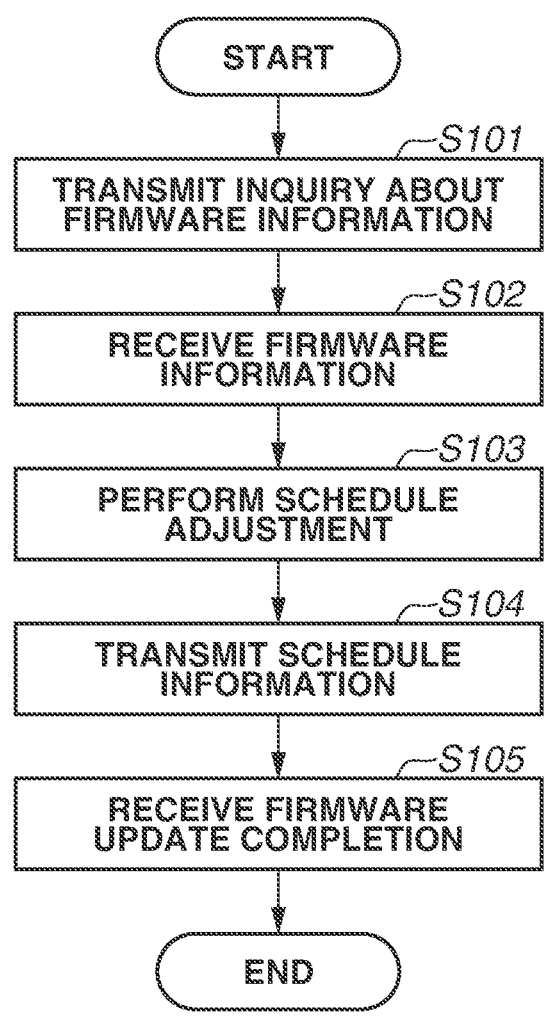
FIG. 4 is a flowchart illustrating an example of firmware update management processing performed when a communication apparatus according to the first exemplary embodiment functions as a controller.

FIG. 4 is a flowchart illustrating an example of firmware update management processing performed when the communication apparatus as an AP functions as a controller in the multi-AP network 6. The firmware update management processing is performed to manage firmware update to the APs 2 to 4 as agents. The AP 1 illustrated in FIG. 1 will be described to function as a controller for convenience. However, the APs 2 to 4 may perform the processing illustrated in FIG. 4 as a controller, instead of the AP 1.

Each step illustrated in FIG. 4 is operated by, in response to power of the AP 1 being turned ON, the control unit 16 reading a program stored in the storage unit 15 and running it. In some embodiments, each step illustrated in FIG. 4 is operated in response to the entrance into a predetermined operation mode such as a communication setting mode or to the start of a predetermined application such as a communication setting application, via a user operation, instead of the power of the AP 1 being turned ON. Each step illustrated in FIG. 4 may be periodically operated at predetermined intervals while the multi-AP network 6 is formed.

At least a part of the flowchart process illustrated in FIG. 4 may be operated by hardware. For example, a dedicated circuit may be automatically generated on a Field Programmable Gate Array (FPGA) from a program for operating each step with a predetermined compiler. Like a FPGA, the hardware may be a Gate Array circuit like the FPGA or an Application Specific Integrated Circuit (ASIC).

In this case, each block in the flowchart illustrated in FIG. 4 can be considered as a hardware block. A plurality of blocks may be integrated as one hardware block, and one block may be composed of a plurality of hardware blocks.

In step S101, the controller unit 161 of the AP 1 transmits a message for making an inquiry about hardware information to each of the APs 2 to 4 as agents included in the multi-AP network 6. The controller unit 161 broadcasts the message to the multi-AP network 6.

The firmware information inquired of the APs 2 to 4 by the controller unit 161 contains the version number of the firmware specific to each AP, and the date the firmware was written or updated. The firmware information further contains the version number of the Wi-Fi EasyMesh® standard with which the APs are compliant.

In step S102, the controller unit 161 receives the firmware information transmitted from each of the APs 2 to 4 as the other agent APs other than the communication apparatus, in response to the inquiry in step S101.

In step S103, the controller unit 161 refers to the firmware information received from each of the APs 2 to 4 in step S102, and performs schedule adjustments of the time each of the APs 2 to 4 will perform the firmware update.

For example, the controller unit 161 determines the time each AP performs the firmware update so that, among the AP2 to 4, performing the firmware update to one AP will not overlap in time with performing the firmware update to another. The controller unit 161 may perform schedule adjustments on an AP with an earlier version number of the firmware or the Wi-Fi EasyMesh® standard prior to the other APs. Likewise, the controller unit 161 may perform schedule adjustments on an AP with an earlier date of the firmware update prior to the other APs.

The controller unit 161 may further determine the time and/or the order of firmware update to each of the APs 2 to 4 based on the topology information, load information, and congestion information about the network received from each AP.

In step S104, the controller unit 161 transmits information about the schedule adjusted in step S103 to each of the APs 2 to 4. The schedule information to be transmitted includes information about the time of the firmware update corresponding to each AP. Each of the APs 2 to 4 performs the firmware update according to the schedule information transmitted in step S104.

In step S105, the controller unit 161 receives a notification transmitted from each of the APs 2 to 4 that the firmware update has been completed.

The controller unit 161 starts the processing in step S101 and repeats the processing in steps S101 to S105 at predetermined intervals.

<Firmware Update Processing>

Figure 5:
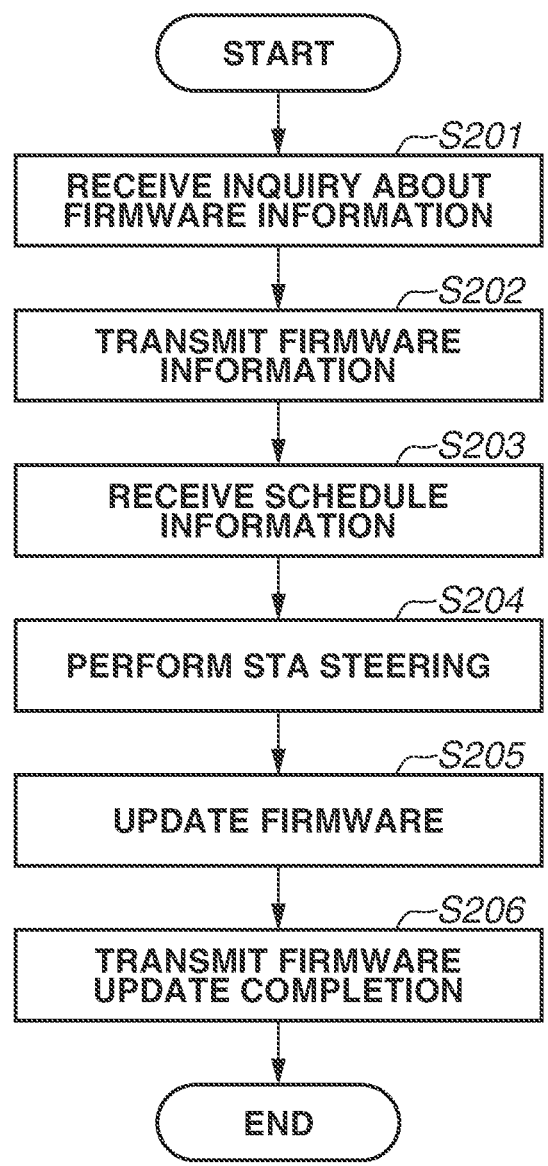
FIG. 5 is a flowchart illustrating an example of firmware update processing performed when a communication apparatus according to the first exemplary embodiment functions as an agent.

FIG. 5 is a flowchart illustrating an example of firmware update processing performed when a communication apparatus as an AP functions as an agent in the multi-AP network 6. Although it will be described on the assumption that the AP 2 illustrated in FIG. 1 functions as an agent for convenience, similar firmware update processing is assumed to be performed on the APs 3 and 4.

Each step illustrated in FIG. 5 is operated while the AP 2 is included in a multi-AP network.

In step S201, the agent unit 262 of the AP 2 receives a message for making an inquiry about the firmware information about the AP 2 transmitted from the AP 1.

In step S202, the agent unit 262 transmits the firmware information about the AP 2 to the AP 1 in response to the received inquiry. The firmware information transmitted to the AP 1 in step S202 includes the AP-specific firmware version information, the date the firmware was written or updated, and the version number of the Wi-Fi EasyMesh® standard with which the AP 1 is compliant. The AP 1 performs time schedule adjustments of firmware update between the APs 2, 3, and 4 as agents based on the firmware information about the AP 2 transmitted to the AP 1 in step S202.

In step S203, the agent unit 262 receives schedule information transmitted from the AP 1, which contains information about the time of firmware update to the AP 2.

In step S204, the agent unit 262 refers to the received schedule information, and performs steering on the STAs connected to the AP 2 before the time of the firmware update to the AP 2.

More specifically, the agent unit 262 performs processing of disconnecting all or a part of the STAs connecting to the AP 2 and inhibiting connection of the other APs to these STAs. If possible, the agent unit 262 further performs steering (loaming) to connect the STAs to be disconnected to either the APs 3 or 4 as the other APs included in the multi-AP network 6.

In step S205, the agent unit 262 performs the firmware update to the AP 2 at the scheduled time included in the schedule information received from the AP 1 in step S203.

In step S206, the agent unit 262 transmits a notification to the AP1 that the AP 2 has completed the firmware update. If the AP 2 fails in the firmware update, the agent unit 262 may notify the AP 1 as a controller of the failure.

<Control Sequence for Firmware Update in Multi-AP Network>

Figure 6:
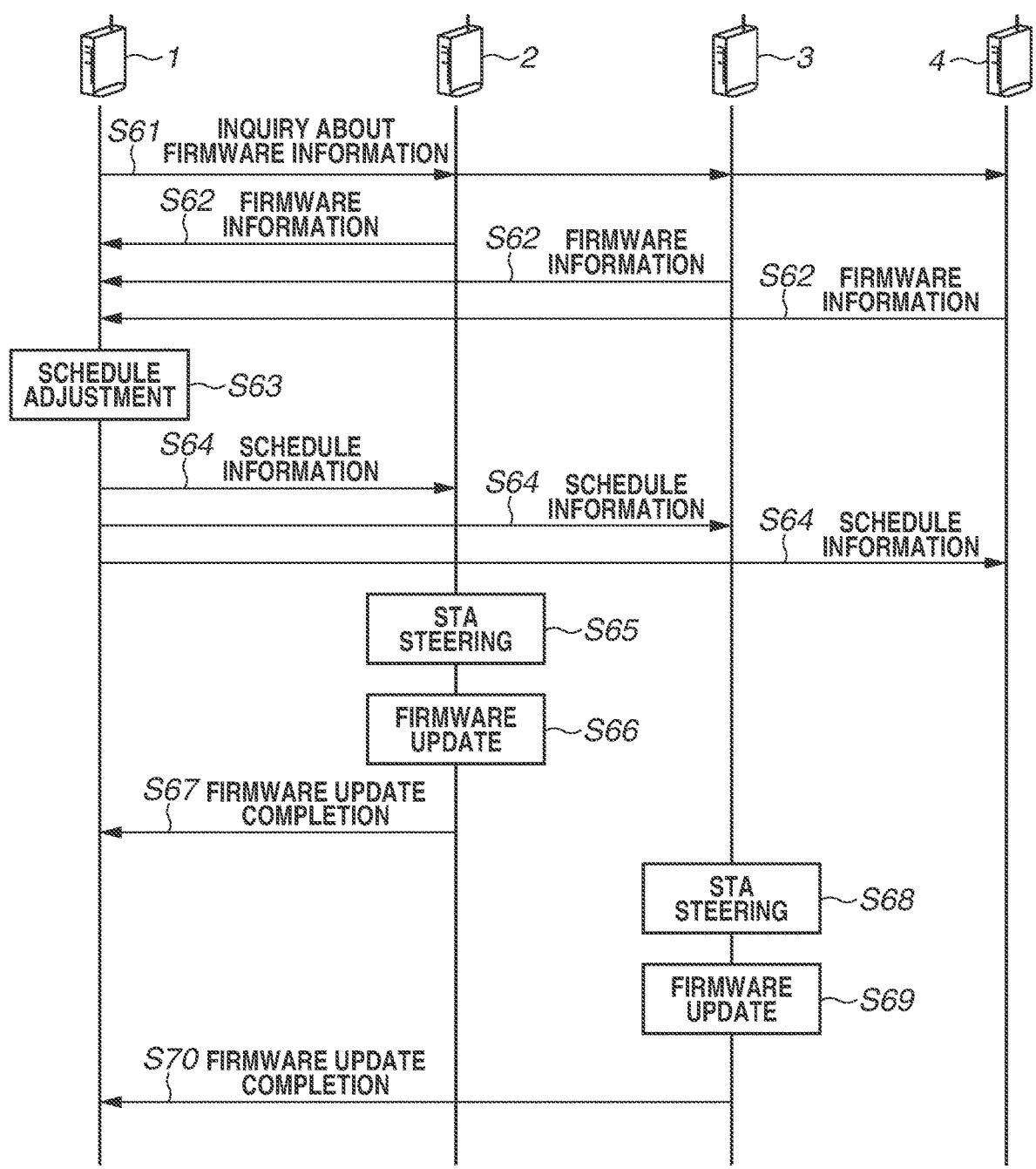
FIG. 6 is a sequence diagram illustrating an example of a firmware update processing sequence between communication apparatuses in a communication network according to the first exemplary embodiment.

FIG. 6 illustrates an example of a control sequence of the firmware update adjusted between the APs in the multi-AP network 6.

In the multi-AP network 6 formed of the AP1 as controller and the APs 2 to 4 as agents, in step S61, the AP 1 transmits to each AP as agents a message for making an inquiry about the firmware information about the AP. More specifically, the AP 1 broadcasts the message to the multi-AP network 6.

Upon reception of the inquiry message, then in step S62, each of the APs 2 to 4 transmits the firmware information about the AP to the AP 1 in response to the inquiry.

In step S63, the AP 1 performs schedule adjustments, i.e., adjusts the time of firmware update between the APs 2, 3, and 4 based on the firmware information received from each of the APs 2 to 4.

In step S64, the AP 1 transmits the schedule information including the scheduled firmware update time to each of the APs 2 to 4. The firmware update schedule between the APs 2 to 4 here is assumed to have been adjusted so that the firmware update will be performed in the sequential order of the APs 2, 3, and 4.

In step S65, the AP 2 performs steering to reconnect the STAs connecting to the AP 2 to another AP before the firmware update time received by the AP 2.

In step S66, the AP 2 updates the firmware of the AP 2 at the firmware update time.

In step S67, the AP 2 transmits a notification to the AP1 that the AP 2 has completed the firmware update.

Likewise, in step S68, the AP 3 performs steering to reconnect the STAs connecting to the AP 3 to another AP before the firmware update time received the AP 3. The received schedule information is assumed to specify the firmware update time later than the firmware update time on the AP 2.

In step S69, the AP 3 updates the firmware of the AP 3 at the firmware update time received by the AP 3. In step S70, the AP 3 transmits a notification to the AP 1 that the AP 3 has completed the firmware update.

Although not illustrated, the AP 4 may also perform processing similar to steps S65 to S67 and S68 to S70 based on the firmware update time later than those of the APs 2 and 3. Alternatively, if the schedule information transmitted to the AP 4 in step S64 indicates that the firmware update to the AP 4 will not be performed, the AP 4 will not perform the firmware update.

If the AP 1 has not received a notification that the firmware update has been completed (time-out occurs) after a predetermined time period has elapsed since the scheduled firmware update time adjusted between the APs 2 to 4 as agents, the AP 1 may perform schedule adjustments again. If the AP 1 receives a firmware update failure notification from an agent AP, the AP 1 may perform schedule adjustments again. Alternatively, the AP 1 may exclude the AP of time-out or the AP that has transmitted a failure notification from the firmware update targets, and output a predetermined error message indicating that the firmware update will not be performed.

As discussed above, according to the present exemplary embodiment, the controller communication apparatus acquires the firmware information about the agent communication apparatus from each agent communication apparatus, and adjusts the schedule of firmware update between a plurality of agent communication apparatuses.

Then, the controller communication apparatus notifies those agent communication apparatuses of the adjusted schedule.

Each agent communication apparatus transmits firmware information about itself to the controller communication apparatus, and performs firmware update on the schedule received from the controller communication apparatus.

This configuration enables the controller in a wireless network including a plurality of access points to make a schedule of firmware update so that performing the firmware update to one access point will not be overlap in time with performing the firmware update to another. As each agent acquires the firmware update schedule for itself, the acquired schedule allows firmware download, STA steering, other preparations before the schedule.

Thus, in a wireless network including a plurality of access points, the above configuration enables proper firmware updates to the plurality of access points while the STA network connectivity and availability remains not lowered.

A second exemplary embodiment will be described in detail centering on differences from the first exemplary embodiment, with reference to FIGS. 7 to 9.

According to the first exemplary embodiment, the controller in the multi-AP network 6 notifies each agent of the schedule adjusted for the firmware update between the agents, and each agent updates the firmware. According to the present exemplary embodiment, the controller in the multi-AP network 6 broadcasts the schedule and an instruction for starting the firmware update to a plurality of agents in the multi-AP network. Before the firmware update, a plurality of access points performs STA steering in cooperation.

The hardware functional configurations of the communication apparatuses as a controller and an agent according to the second exemplary embodiment are similar to those of the communication apparatuses according to the first exemplary embodiment described above with reference to FIGS. 2 and 3, and redundant descriptions thereof will be omitted.

<Firmware Update Management Processing>

Figure 7:
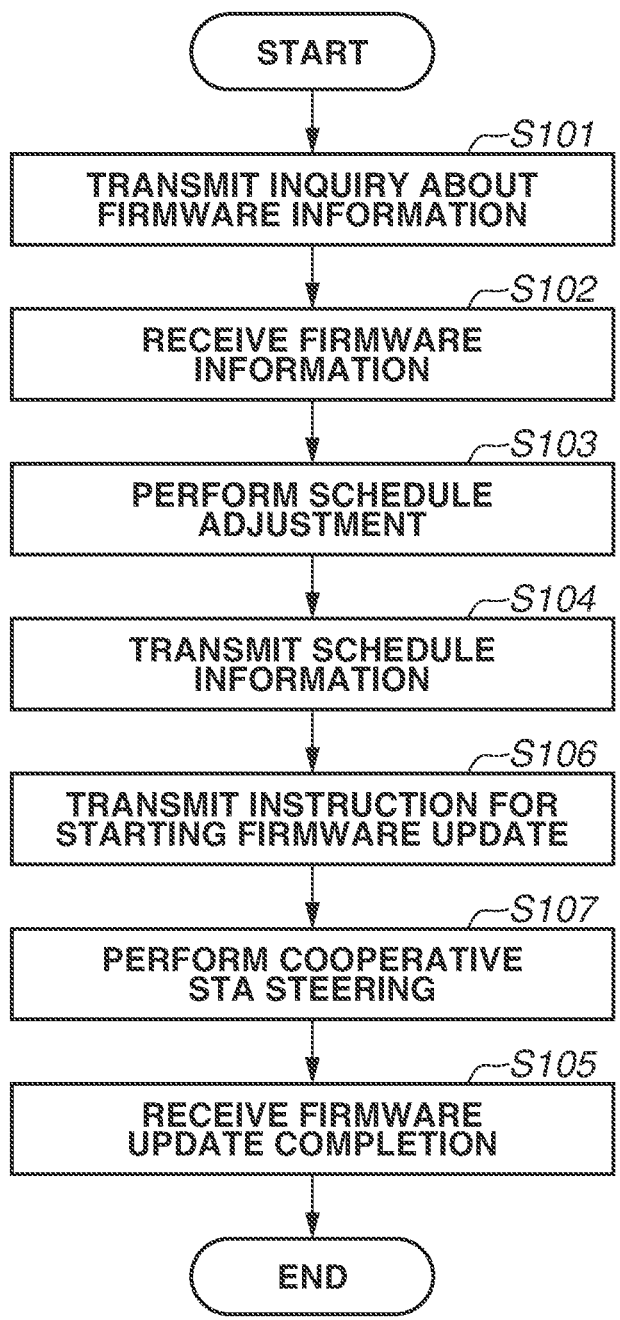
FIG. 7 is a flowchart illustrating an example of firmware update management processing performed when a communication apparatus according to a second exemplary embodiment functions as a controller.

FIG. 7 is a flowchart illustrating an example of firmware update management processing performed when a communication apparatus according to the present exemplary embodiment functions as a controller in the multi-AP network 6.

Processing in steps S101 to S103 is similar to the firmware update management processing performed by a communication apparatus (AP 1) according to the first exemplary embodiment illustrated in FIG. 4.

In step S104, the controller unit 161 of the AP 1 broadcasts the information about the schedule adjusted in step S103 to the multi-AP network 6 including the APs 2 to 4. Broadcasting is an example of multi-address transmission, and another multi-address transmission such as multicasting may be employed. According to the present exemplary embodiment, the schedule information transmitted by the controller unit 161 to each of the APs 2 to 4 includes information about the order of the firmware update to the APs 2 to 4 as agents.

After broadcasting the schedule information to the multi-AP network 6 in step S104, then in step S106, the controller unit 161 transmits an instruction message for starting the firmware update to the APs 2 to 4. The instruction message includes the broadcasted schedule information in step S104, and the instruction message is also broadcasted as in step S104. This enables the APs 2 to 4 to recognize when they will perform the firmware update in the order.

In step S107, the controller unit 161 performs steering on the STAs connecting to the APs in the multi-AP network 6. According to the present exemplary embodiment, the controller unit 161 performs STA steering in cooperation with the APs 2 to 4 in the multi-AP network 6. More specifically, in cooperation with the APs 2 to 4, the controller unit 161 performs STA steering to reconnect the STAs connecting to the AP as the first firmware update target to another AP in the multi-AP network 6.

After the STA steering performed in step S107, the firmware update is performed to the APs 2 to 4 in the broadcasted order, and each AP transmits a notification that it has completed the firmware update.

In step S105, the controller unit 161 receives the notification transmitted from each of the APs 2 to 4 that the firmware update has been completed.

The controller unit 161 starts the processing in step S101 to repeat the processing illustrated in FIG. 7 at predetermined intervals.

<Firmware Update Processing>

Figure 8:
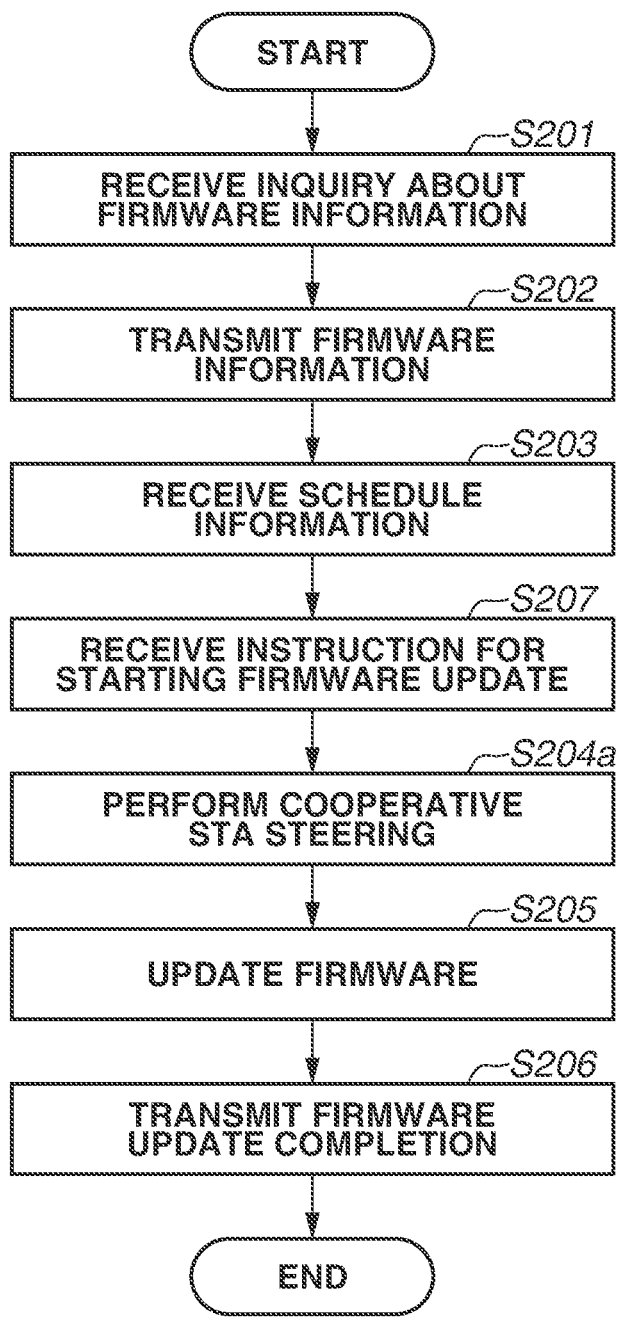
FIG. 8 is a flowchart illustrating an example of firmware update processing performed when a communication apparatus according to the second exemplary embodiment functions as an agent.

FIG. 8 is a flowchart illustrating an example of firmware update processing performed when a communication apparatus according to the present exemplary embodiment functions as an agent in the multi-AP network 6.

The processing in steps S201 to S203 is similar to the firmware update processing performed by a communication apparatus (AP 2) according to the first exemplary embodiment illustrated in FIG. 5. According to the present exemplary embodiment, the broadcasted schedule information received by the agent unit 262 of the AP 2 in step S203 includes the order of the firmware update to the APs 2 to 4.

After reception of the schedule information from the AP 1 in step S203, in step S207, the agent unit 262 receives the instruction message for starting the firmware update broadcasted from the AP 1 to the multi-AP network 6. In this case, the instruction message is assumed to specify the AP 2 as the first AP subject to the firmware update. Alternatively, the instruction message may indicate that the AP 2 will perform the firmware update.

Upon reception of the instruction message in step S207, in step S204*a*, the agent unit 262 performs STA steering in cooperation with the other APs in the multi-AP network 6. More specifically, in cooperation with the other APs, the agent unit 262 performs the STA steering to reconnect the STA connecting to the AP 2 as the first firmware update target to another AP in the multi-AP network 6.

In step S205, if the AP2 is the first in the order of the firmware update included in the schedule information from the AP 1 in step S203, the agent unit 262 of the AP 2 performs the firmware update.

In step S206, the agent unit 262 broadcasts a notification to the multi-AP network 6 that the AP 2 has completed the firmware update. If the AP 2 fails in the firmware update, the agent unit 262 may broadcast a failure notification.

<Control Sequence of Firmware Update in Multi-AP Network>

Figure 9:
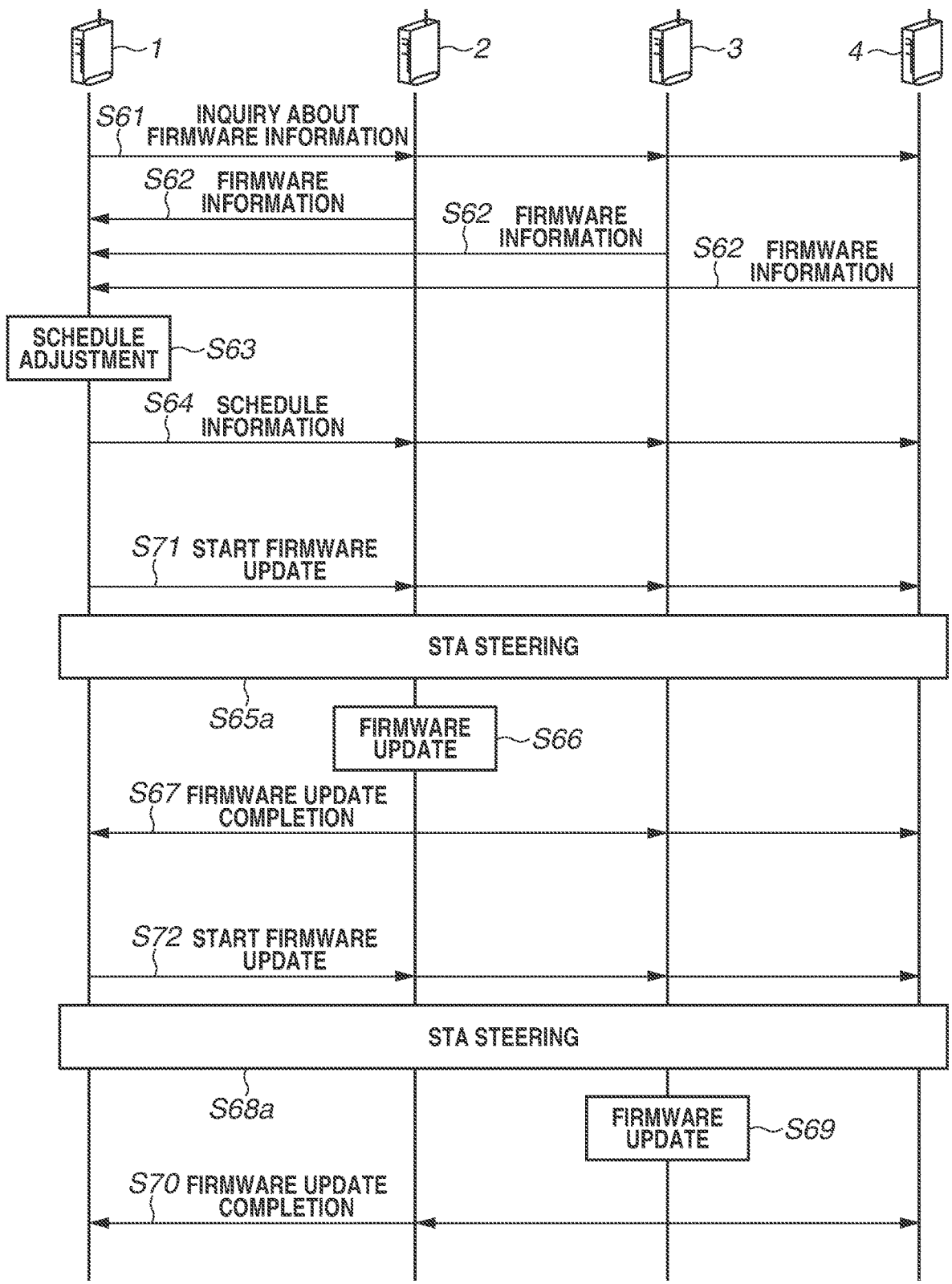
FIG. 9 is a sequence diagram illustrating an example of a firmware update processing sequence between communication apparatuses in a communication network according to the second exemplary embodiment.

FIG. 9 illustrates an example of a control sequence of the firmware update to the APs in the multi-AP network 6 in order according to the present exemplary embodiment.

The processing in steps S61 to S63 is similar to the processing according to the first exemplary embodiment illustrated in FIG. 6.

In step S64, the AP 1 broadcasts to the multi-AP network 6 including the APs 2 to 4 the schedule information including the order of the scheduled firmware update. In this case, the schedule is assumed to have been adjusted that the firmware update will be performed in the order of the APs 2 to 4.

After broadcasting the schedule information to the multi-AP network 6 in step S64, in step S71, the AP 1 broadcasts the instruction message for performing the firmware update to the multi-AP network 6 including the APs 2 to 4.

In step S65*a*, the AP2 performs the steering to reconnect the STAs connecting to the AP2 to another agent AP in cooperation with the other APs before the AP2 designated as the first in the firmware update order performs the firmware update.

In step S66, the AP 2 updates the firmware of the AP 2 prior to the APs 3 and 4.

In step S67, the AP 2 broadcasts a notification to the multi-AP network 6 that AP 2 has completed the firmware update.

The subsequent processing on the AP 3 designated as the second firmware update target is similar to the processing in steps S71, S65*a*, S66 and S67. More specifically, upon reception of the notification that the AP 2 has completed the firmware update in step S67, in step S72, the AP 1 broadcasts an instruction message for starting the firmware update to the multi-AP network 6. The instruction message broadcasted in step S72 causes the AP 3 to perform the firmware update.

In step S68*a*, the AP3 performs steering to reconnect the STAs connecting to the AP3 to another agent AP in cooperation with the other APs before the AP 3 performs the firmware update, and in step S69, updates the firmware of the AP 3.

In step S70, the AP 3 broadcasts a notification to the multi-AP network 6 that the AP 3 has completed the firmware update.

As described above, according to the present exemplary embodiment, the communication apparatus functioning as a controller broadcasts an instruction message for starting the firmware update, together with the schedule information, to the multi-AP network 6.

Upon reception of the instruction message for starting the firmware update, each communication apparatus functioning as an agent performs STA steering in cooperation with the other APs, updates the firmware of itself, and broadcasts a notification that the firmware update has been completed.

This enables STA steering and quick firmware update in update order in cooperation with a plurality of APs connected in a multi-AP network.

A third exemplary embodiment will be described in detail centering on differences from the first exemplary embodiment, with reference to FIGS. 10 to 12.

According to the first exemplary embodiment, the controller in the multi-AP network 6 notifies each agent of the schedule adjusted for the firmware update between the agents, and each agent updates the firmware. According to the present exemplary embodiment, the controller in the multi-AP network 6 proposes an adjusted schedule to each AP and the agent determines whether the firmware update will be performed on the proposed schedule.

The hardware functional configurations of the communication apparatuses as a controller and an agent according to the third exemplary embodiment are similar to those of the communication apparatuses according to the first exemplary embodiment described above with reference to FIGS. 2 and 3, and redundant descriptions thereof will be omitted.

<Firmware Update Management Processing>

Figure 10:
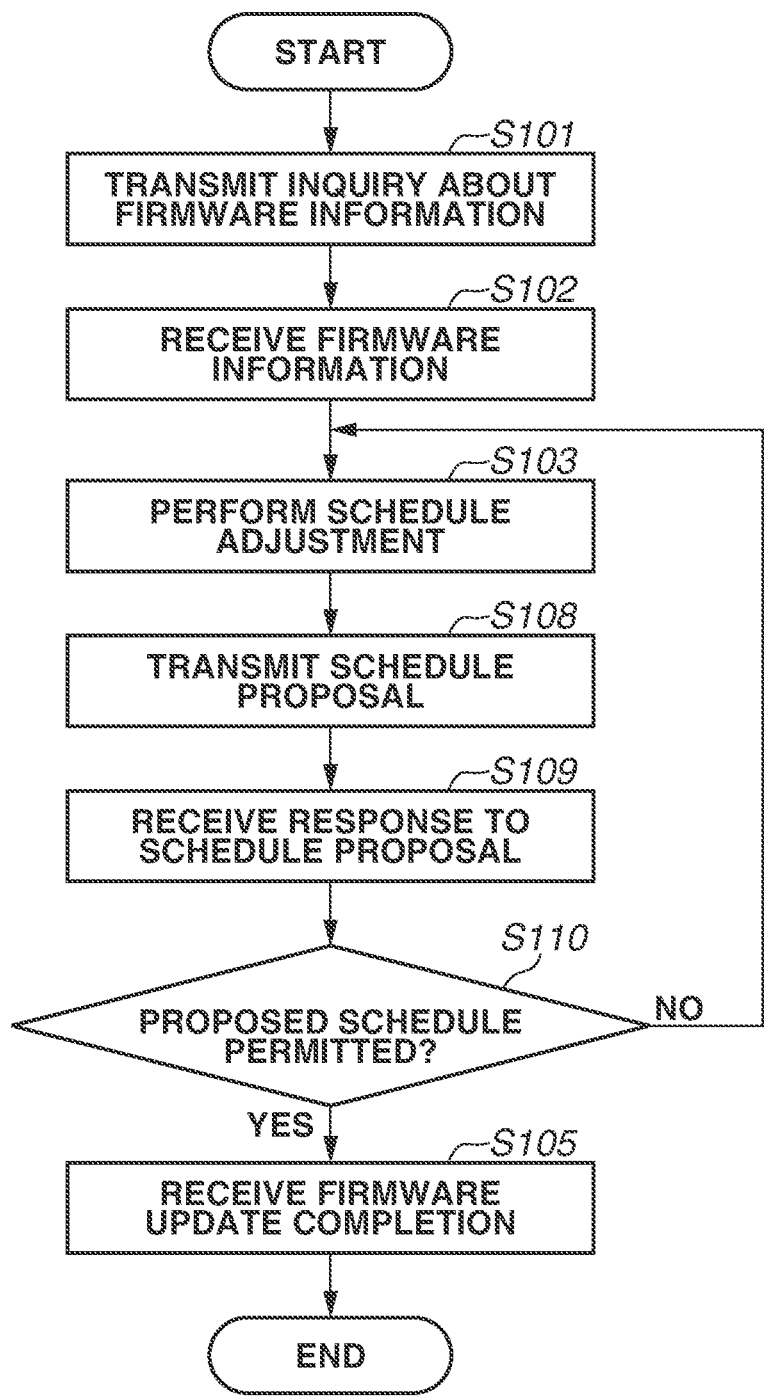
FIG. 10 is a flowchart illustrating an example of firmware update management processing performed when a communication apparatus according to a third exemplary embodiment functions as a controller.

FIG. 10 is a flowchart illustrating an example of firmware update management processing performed when a communication apparatus according to the present exemplary embodiment functions as a controller in the multi-AP network 6.

The processing in steps S101 to S103 is similar to the firmware update management processing performed by a communication apparatus (AP 1) according to the first exemplary embodiment illustrated in FIG. 4. In step S103, the controller unit 161 of the AP 1 performs schedule adjustments of firmware update to the APs 2 to 4 so that, among the APs, performing the firmware update to one will not overlap in time with performing the firmware update to another.

After the schedule adjustment performed in step S103, in step S108, the controller unit 161 of the AP 1 transmits a message for proposing the schedule adjusted in step S103 to each of the APs 2 to 4. According to the present exemplary embodiment, the proposal for the schedule includes the information about the adjusted schedule in step S103, which includes the time each of the APs will perform the firmware update.

In step S109, the controller unit 161 receives a response to the proposal from each of the APs 2 to 4.

In step S110, the controller unit 161 refers to the responses to determine whether the proposed schedule is permitted by the APs 2 to 4.

If the proposed schedule is not permitted (NO in step S110), the processing returns to step S103. In step S103, the controller unit 161 adjusts the schedule of the firmware update again. When the response to the proposal for the schedule received in step S109 includes an alternative time the firmware can be updated to the corresponding AP, the controller unit 161 may adjust the schedule to the alternative time.

On the other hand, if the proposed schedule is permitted (YES in step S110), the processing proceeds to step S105. In step S105, the controller unit 161 receives a notification transmitted from each of the APs 2 to 4 that the firmware update has been completed.

The controller unit 161 repeats the processing illustrated in FIG. 10 at predetermined intervals.

<Firmware Update Processing>

Figure 11:
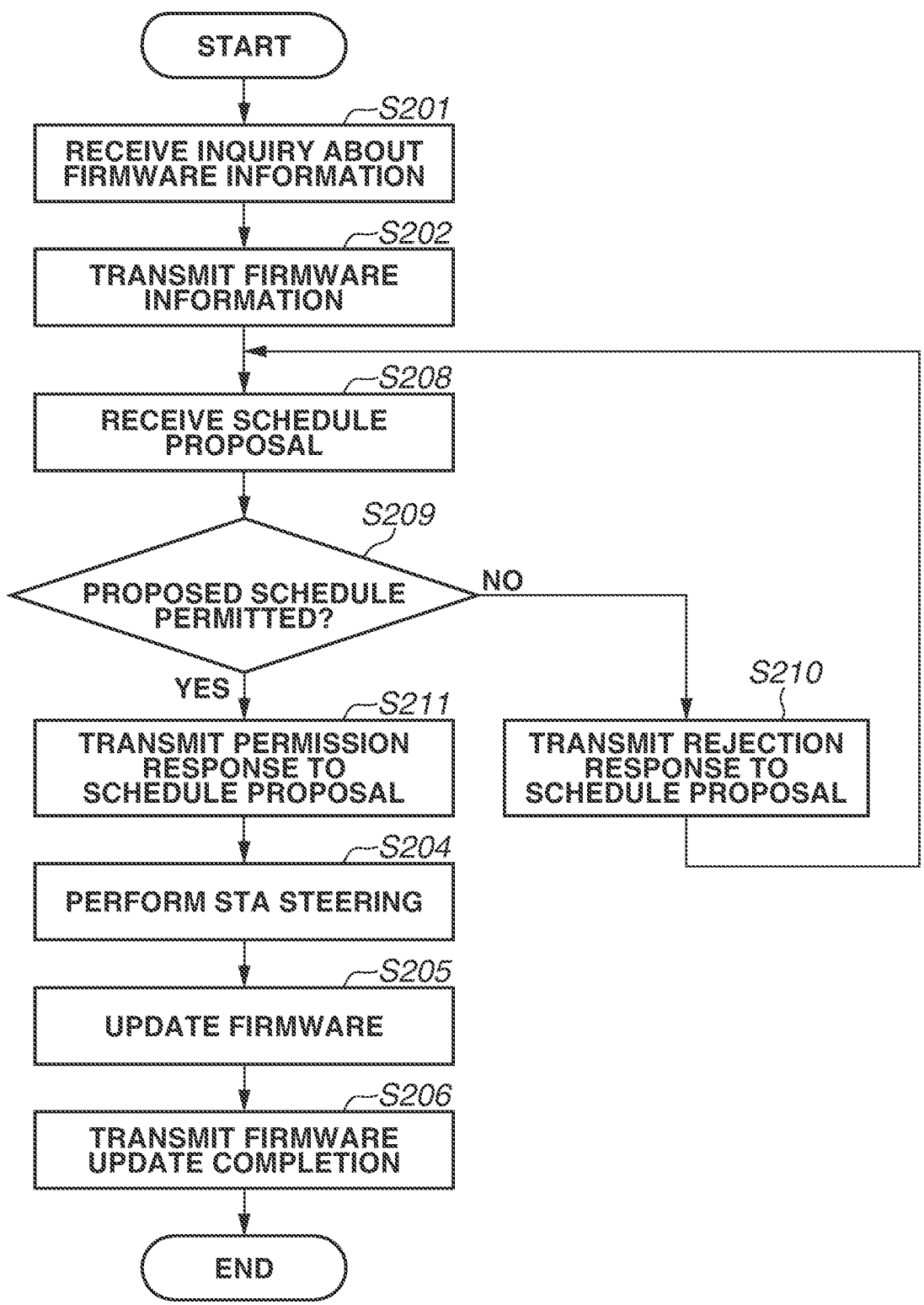
FIG. 11 is a flowchart illustrating an example of firmware update processing performed when a communication apparatus according to the third exemplary embodiment functions as an agent.

FIG. 11 is a flowchart illustrating an example of firmware update processing performed when a communication apparatus according to the present exemplary embodiment functions as an agent in the multi-AP network 6.

The processing in step S201 to S202 is similar to the firmware update processing performed by a communication apparatus (AP 2) according to the first exemplary embodiment illustrated in FIG. 5.

After transmission of the firmware information in step S202, in step S208, the agent unit 262 of the AP 2 receives the message of the proposal of the schedule of the firmware update from the AP 1.

In step S209, the agent unit 262 determines whether to perform the firmware update on the proposed schedule based on the schedule information in the message of the proposal received in step S208. More specifically, the agent unit 262 may determine whether the firmware update to the AP 2 can be performed at the proposed time of the firmware update, based on the load of preparations made prior to the firmware update. For example, the agent unit 262 may determine whether the firmware update can be performed on the proposed schedule, based on the number of STAs connected to the AP2.

If the firmware update will not be performed on the proposed schedule (NO in step S209), the processing proceeds to step S210. In step S210, the agent unit 262 transmits a rejection response as a determination result for the proposal to the AP 1. Then, the processing returns to step S208. On the other hand, if the firmware update will be performed on the proposed schedule (YES in step S209), the processing proceeds to step S211. In step S211, the agent unit 262 transmits a permission response to the proposal to the AP 1. Then, the processing proceeds to step S204.

After the transmission of the permission response in step S211, the agent unit 262 performs processing in steps S204 to S206, which is identical to the processing in steps S204 to S206 illustrated in FIG. 5. More specifically, in step S204, the agent unit 262 performs steering on the STAs connected to the AP 2 before the firmware update time included in the proposal comes. In step S205, the agent unit 262 performs the firmware update. In step S206, the agent unit 262 transmits a notification to the AP 1 that the firmware update has been completed.

<Control Sequence of Firmware Update in Multi-AP Network>

Figure 12:
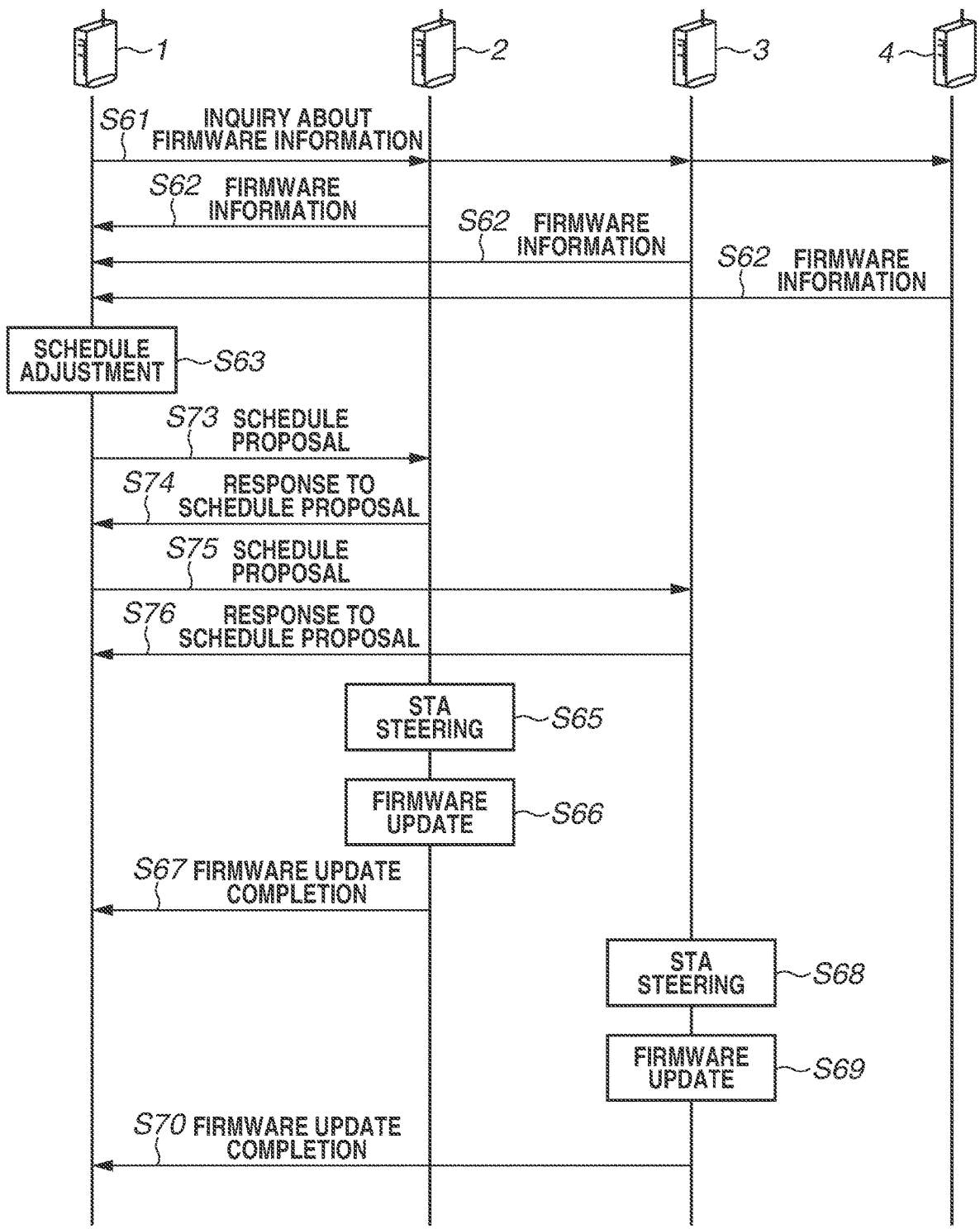
FIG. 12 is a sequence diagram illustrating an example of a firmware update processing sequence between communication apparatuses in a communication network according to the third exemplary embodiment.

FIG. 12 illustrates an example of a control sequence of the firmware update processing between the APs in the multi-AP network 6 according to the present exemplary embodiment.

The processing of steps S61 to S63 is identical to the processing of steps S61 to S63 according to the first exemplary embodiment illustrated in FIG. 6.

After performing the schedule adjustments of the firmware update between the APs 2 to 4 in step S63, in step S73, the AP 1 transmits a proposal of the schedule of the firmware update to the AP 2. Upon reception of the proposal in step S74, the AP 2 transmits a response to the proposal to the AP 1.

Likewise, in step S75, the AP 1 transmits the proposal for the schedule of the firmware update to the AP 3. Upon reception of the proposal, in step S76, the AP 3 transmits a response to the proposal to the AP 1. Referring to FIG. 12, each of the APs 2 and 3 transmits a permission response to the proposal to the AP 1.

Steps S65 to S67 are identical to steps S65 to S67 illustrated in FIG. 6. More specifically, in step S65, the AP 2 performs the steering to reconnect the STAs connecting to the AP 2 to another AP as an agent before the firmware update time designated as the schedule information comes, based on the schedule information in the schedule proposed in step S73.

In step S66, the AP 2 updates the firmware of the AP 2. In step S67, the AP 2 transmits a notification to the AP 1 that the AP 2 has completed the firmware update.

In steps S68 to S70, the AP 3 performs similar processing to steps S65 to S67.

As discussed above, according to the present exemplary embodiment, the communication apparatus functioning as a controller transmits a proposal for the schedule of firmware update to each communication apparatus functioning as an agent, and, if a rejection response is returned from an agent, readjusts the schedule.

Upon reception of the proposal, each communication apparatus functioning as an agent determines whether to perform the firmware update on the proposed schedule, and returns a permission or rejection response to the proposal to the controller.

Even if any of the APs connected in the multi-AP network 6 cannot perform the firmware update on the adjusted schedule, the above-described procedure enables readjusting the schedule of the firmware update to the corresponding AP. This provides quick firmware update to a plurality of APs in a multi-AP network without delay.

A fourth exemplary embodiment will be described in detail centering on differences from the first exemplary embodiment, with reference to FIGS. 13 to 15.

According to the first exemplary embodiment, the controller in the multi-AP network 6 notifies each agent of the adjusted schedule of the firmware update between the agents, and each agent updates the firmware. According to the present exemplary embodiment, an agent requests the controller for the schedule of firmware update to the agent, and the controller adjusts the schedule of firmware update to the agent and transmits the adjusted schedule to the requestor agent.

The hardware functional configurations of the communication apparatuses as a controller and an agent according to the fourth exemplary embodiment are similar to those of the communication apparatuses according to the first exemplary embodiment described above with reference to FIGS. 2 and 3, and redundant descriptions thereof will be omitted.

<Firmware Update Management Processing>

Figure 13:
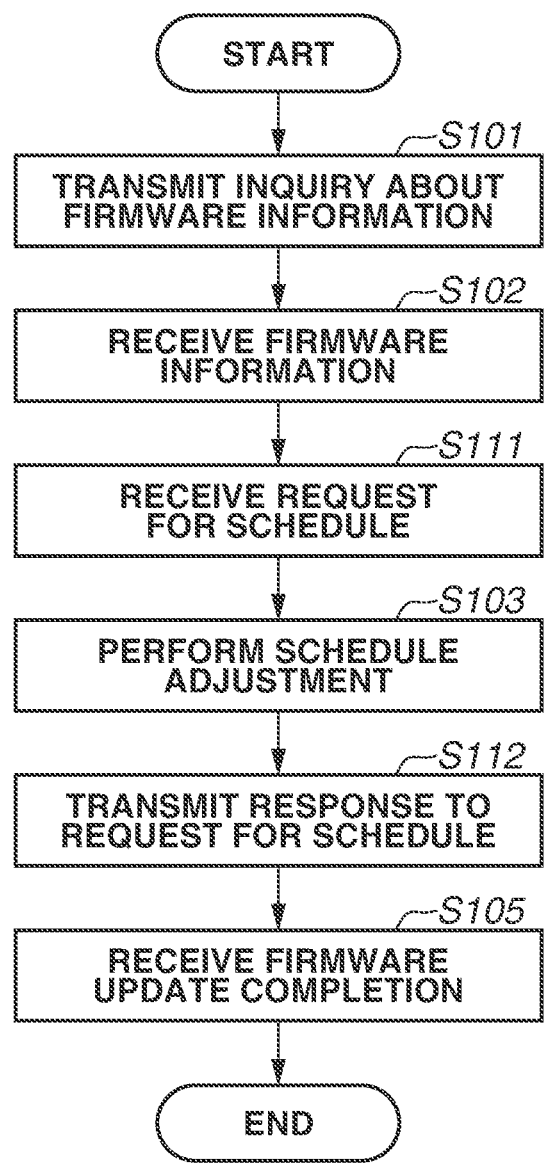
FIG. 13 is a flowchart illustrating an example of firmware update management processing performed when a communication apparatus according to a fourth exemplary embodiment functions as a controller.

FIG. 13 is a flowchart illustrating an example of firmware update management processing performed when a communication apparatus according to the present exemplary embodiment functions as a controller in the multi-AP network 6.

The processing to S101 to S102 is similar to the firmware update management processing performed by a communication apparatus (AP 1) according to the first exemplary embodiment illustrated in FIG. 4.

After the reception of the firmware information from the APs 2 to 4 in step S102, in step S111, the controller unit 161 of the AP 1 receives from one of the APs 2 to 4 as agents a message for requesting the AP 1 for the schedule of firmware update to the corresponding AP.

In step S103, the controller unit 161 adjusts the schedule of firmware update to the requestor AP, based on the firmware information received from each of the APs 2 to 4 in step S62. More specifically, the controller unit 161 performs schedule adjustments of the firmware update time of the requestor AP so that, among the APs 2 to 4, performing the firmware update to one AP will not overlap in time with performing the firmware update to another.

In step S112, the controller unit 161 transmits to the requestor AP the adjusted schedule of the firmware update to the requestor AP.

In step S105, like step S105 illustrated in FIG. 6, the controller unit 161 receives a notification from the requestor AP that the firmware update has been completed.

The controller unit 161 repeats the processing illustrated in FIG. 13 at predetermined intervals.

<Firmware Update Processing>

Figure 14:
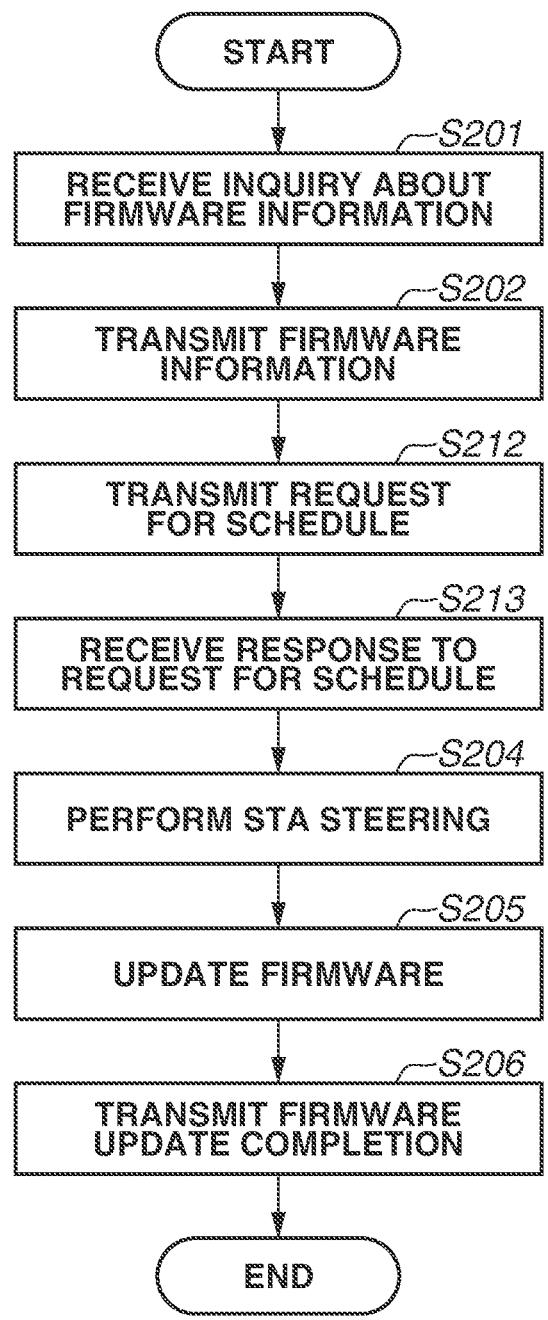
FIG. 14 is a flowchart illustrating an example of firmware update processing performed when a communication apparatus according to the fourth exemplary embodiment functions as an agent.

FIG. 14 is a flowchart illustrating an example of firmware update processing performed when a communication apparatus according to the present exemplary embodiment functions as an agent in the multi-AP network 6.

Processing in steps S201 to S202 is similar to the firmware update processing performed by a communication apparatus (AP 2) according to the first exemplary embodiment illustrated in FIG. 5.

After the transmission of the firmware information in step S202, in step S212, the agent unit 262 of the AP 2 transmits to the AP 1 a message for requesting the AP 1 for the schedule of firmware update to the AP 2. The AP 1 adjusts the schedule of firmware update to the AP 2 upon the request.

In step S213, the agent unit 262 receives from the AP 1 the schedule information about the firmware update to the AP 2 in response to the request.

After the reception of the response to the request for the schedule in step S213, the agent unit 262 performs processing in steps S204 to S206, which is identical to the processing in steps S204 to S206 illustrated in FIG. 5. More specifically, in step S204, the agent unit 262 performs steering on the STAs connected to the AP 2 before the firmware update time included in the response comes. In step S205, the agent unit 262 performs the firmware update. In step S206, the agent unit 262 transmits a notification to the AP 1 that the firmware update has been completed.

<Control Sequence of Firmware Update in Multi-AP Network>

Figure 15:
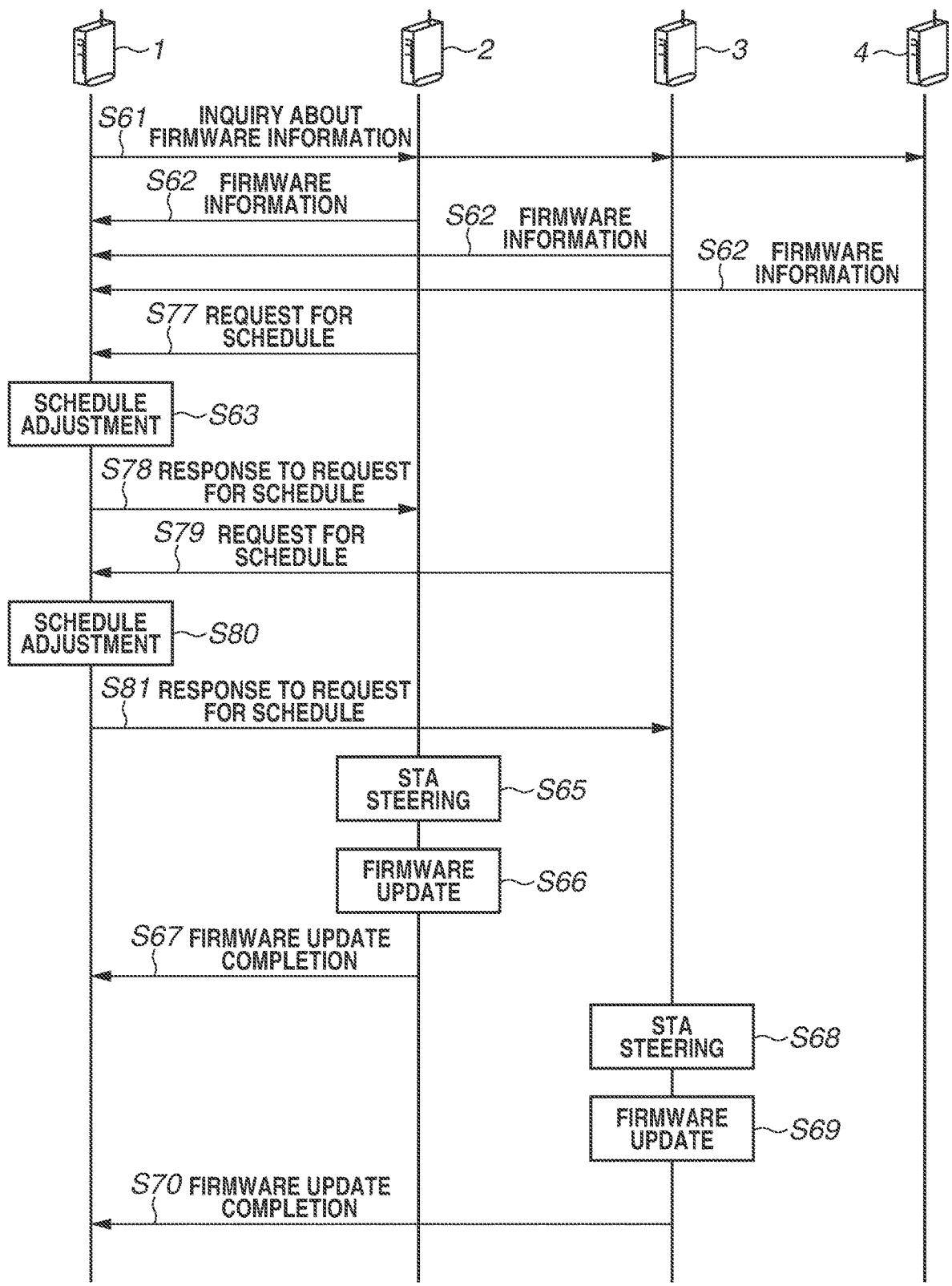
FIG. 15 is a sequence diagram illustrating an example of a firmware update processing sequence between communication apparatuses in a communication network according to the fourth exemplary embodiment.

FIG. 15 illustrates an example of a control sequence of the firmware update processing between the APs in the multi-AP network 6 according to the present exemplary embodiment.

The processing in steps S61 to S62 is identical to the processing in steps S61 to S62 according to the first exemplary embodiment illustrated in FIG. 6.

After the reception of the firmware information from each of the APs 2 to 4 in step S62, in step S77, the AP 2 transmits to the AP 1 a request for the schedule of firmware update to the AP 2. In step S63, the AP 1 performs the schedule adjustments of firmware update to the AP 2, based on the firmware information about the APs 2 to 4 received in step S62. In step S78, the AP 1 transmits a response to the request to the AP 2.

In steps S79 to S81, the AP 3 performs similar processing to the processing in steps S77, S63, and S78. More specifically, in step S79, the AP 3 transmits to the AP 1 a request for the schedule of firmware update to the AP 3. In step S80, the AP 1 performs schedule adjustments of firmware update to the AP 3. In step S81, the AP 1 transmits a response to the request to the AP 3.

Steps S65 to S67 are identical to steps S65 to S67 illustrated in FIG. 6. More specifically, in step S65, the AP 2 performs steering to reconnect the STAs connecting to the AP 2 to another AP before the firmware update time designated as the schedule information in the response to the request in step S78 comes.

In step S66, the AP 2 updates the firmware of the AP 2. In step S67, the AP 2 transmits a notification to the AP 1 that the AP 2 has completed the firmware update.

In steps S68 to S70, the AP 3 performs similar processing to steps S65 to S67.

As discussed above, according to the present exemplary embodiment, in response to a request from a communication apparatus functioning as an agent, the communication apparatus functioning as a controller adjusts the schedule of firmware update to the requestor agent, thus responding to the requestor agent.

Each communication apparatus functioning as an agent requests the controller for the schedule of firmware update to the corresponding agent communication apparatus, and performs the firmware update on the schedule received in response from the controller.

Thus, according to the response to a request from an AP connected in a multi-AP network, the schedule adjustment of firmware update to the corresponding AP is performed. This enables reduction in the load of the schedule adjustments of firmware update to a plurality of APs on the controller.

Other Exemplary Embodiments

A system, an apparatus, a method, a program, or a recording medium (storage medium) is employed in some embodiments of the present invention by way of example. More specifically, the present invention is applicable to a system composed of a plurality of apparatuses (for example, a host computer, an interface device, an imaging apparatus, and a web application) and to an apparatus composed of one device, for example.

Embodiments of the present disclosure can also be implemented with a program for carrying out a part of or at least one function of the functions in the above-described exemplary embodiments. More specifically, embodiments of the present disclosure can also be implemented by the program being supplied to a system or apparatus via a network or storage medium, and at least one processor in a computer (or a CPU or a micro processing unit (MPU)) of the system or apparatus reading and running the program. The program may be provided in a computer-readable recording medium.

The functions of the exemplary embodiments are not limited to the functions carried out by the computer running the read program. The above-described functions in the exemplary embodiments may be carried out through the processing performed by an operating system (OS) operating on the computer, the OS of which performs part or the whole of the actual processing based on instructions of the program.

Various embodiments of the present disclosure make it possible, in a wireless network including a plurality of access points, to suitably update the firmware of the plurality of access points.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-083384, filed May 11, 2020, which is hereby incorporated by reference herein in its entirety.

What is claimed is:

1. An access point apparatus that performs wireless communication conforming to the Institute of Electrical and Electronics Engineers (IEEE) 802.11 series standard, the access point apparatus comprising:
   a management unit configured to manage a mesh type network provided by a plurality of access point apparatuses including the access point apparatus and one or more other access point apparatuses, wherein the one or more other access point apparatuses are each an apparatus that performs wireless communication conforming to the IEEE 802.11 series standard;
   an acquisition unit configured to acquire information about firmware of at least one access point apparatus among the plurality of access point apparatuses;
   a determination unit configured to determine a schedule for updating the firmware of the at least one access point apparatus based on the acquired firmware information; and
   a notification unit configured to notify the at least one access point apparatus of information about the determined schedule,
   wherein the determination unit determines the schedule so that, among the plurality of access point apparatuses, performing the firmware update to one access point apparatus does not overlap in time with performing the firmware update to another access point apparatus.

2. The access point apparatus according to claim 1, wherein the acquisition unit periodically makes an inquiry to the at least one access point apparatus about the firmware information to acquire the firmware information about the at least one access point apparatus.

3. The access point apparatus according to claim 1, wherein, based on the firmware information acquired by the acquisition unit, the determination unit determines the schedule putting a high priority on an access point apparatus having the firmware with an earlier version or date, of the plurality of access points apparatuses.

4. The access point apparatus according to claim 1, further comprising a broadcasting unit configured to broadcast information about the order of starting the firmware update to the wireless network.

5. The access point apparatus according to claim 1, wherein, upon reception of a rejection response to the notified schedule information, from the at least one access point apparatus, the determination unit determines the schedule again based on the rejection response.

6. The access point apparatus according to claim 1, wherein, upon reception of a request for a schedule for updating the firmware of the at least one access point apparatus, from the at least one access point apparatus, the determination unit determines the schedule for the at least one access point apparatus as a requestor.

7. The access point apparatus according to claim 1, wherein the mesh type network is a mesh network conforming to the Wi-Fi EasyMesh® standard, the access point apparatus is a controller and the at least one other access point apparatus is an agent.

8. A method for controlling an access point apparatus that performs wireless communication conforming to the Institute of Electrical and Electronics Engineers (IEEE) 802.11 series standard, the method comprising:
   managing a mesh type network provided by a plurality of access point apparatuses including the access point apparatus and one or more other access point apparatuses, wherein the one or more other access point apparatuses are each an apparatus that performs wireless communication conforming to the IEEE 802.11 series standard;
   acquiring information about firmware of at least one access point apparatus among the plurality of access point apparatuses;
   determining a schedule for updating the firmware of the at least one access point apparatus based on the acquired firmware information; and
   notifying the at least one access point apparatus of information about the determined schedule;
   wherein the determination unit determines the schedule so that, among the plurality of access point apparatuses, performing the firmware update to one access point apparatus does not overlap in time with performing the firmware update to another access point apparatus.

9. A non-transitory computer-readable storage medium storing a computer program for causing a computer to function as:
   an access point apparatus that performs wireless communication conforming to the Institute of Electrical and Electronics Engineers (IEEE) 802.11 series standard, the access point communication apparatus comprising:
   a management unit configured to manage a mesh type network provided by a plurality of access point apparatuses including the access point apparatus and one or more other access point apparatuses, wherein the one or more other access point apparatuses are each an apparatus that performs wireless communication conforming to the IEEE 802.11 series standard;

an acquisition unit configured to acquire information about the firmware of at least one access point apparatus among the plurality of access point apparatuses;

a determination unit configured to determine a schedule for updating the firmware of the at least one access point apparatus based on the acquired firmware information; and a notification unit configured to notify the at least one access point apparatus of information about the determined schedule;

wherein the determination unit determines the schedule so that, among the plurality of access point apparatuses, performing the firmware update to one access point apparatus does not overlap in time with performing the firmware update to another access point apparatus.

10. An access point apparatus that functions as an access point performing wireless communication conforming to the Institute of Electrical and Electronics Engineers (IEEE) 802.11 series standard and establishes a mesh type network with one or more other access point apparatuses, the access point apparatus comprising:

a transmission unit configured to transmit information about firmware of the access point apparatus to a controller apparatus that controls the access point apparatus;

a reception unit configured to receive information about a schedule for updating the firmware of the access point apparatus, from the controller apparatus;

an update unit configured to update the firmware of the access point apparatus based on the received schedule information; and a steering unit configured to perform steering of a station connecting to the access point apparatus before the firmware is updated by the update unit, based on the received schedule information.

11. The access point apparatus according to claim 10, wherein, in response to broadcast of information about order of starting the firmware update, the steering unit performs steering of the station in cooperation with at least one of the one or more other access point apparatuses.

12. The access point apparatus according to claim 10, further comprising:

a determination unit configured to determine whether to update the firmware of the access point apparatus based on the received schedule information; and a second transmission unit configured to transmit a determined result to the controller apparatus.

13. The access point apparatus according to claim 10, further comprising a request unit configured to request the controller apparatus transmit the schedule information.

14. A method for controlling an access point apparatus that functions as an access point performing wireless communication conforming to the Institute of Electrical and Electronics Engineers (IEEE) 802.11 series standard and establishes a mesh type network with one or more other access point apparatuses, the method comprising:

transmitting information about firmware of the access point apparatus to a controller apparatus that controls the access point apparatus;

receiving information about a schedule for updating the firmware of the access point apparatus, from the controller apparatus ;

updating the firmware of the access point apparatus based on the received schedule information; and performing steering of a station connecting to the access point apparatus before the firmware is updated by the update unit, based on the received schedule information.

15. A non-transitory computer-readable storage medium storing a computer program for causing a computer to function as:

an access point apparatus that functions as an access point performing wireless communication conforming to the Institute of Electrical and Electronics Engineers (IEEE) 802.11 series standard and establishes a mesh type network with one or more other access point apparatuses, the access point apparatus comprising:

a transmission unit configured to transmit information about firmware of the access point apparatus to a controller apparatus that controls the access point apparatus;

a reception unit configured to receive information about a schedule for updating the firmware of the access point apparatus, from the controller apparatus;

an update unit configured to update the firmware of the access point apparatus based on the received schedule information; and a steering unit configured to perform steering of a station connecting to the access point apparatus before the firmware is updated by the update unit, based on the received schedule information.

16. The access point apparatus according to claim 10, wherein the mesh type network is a mesh network conforming to the Wi-Fi EasyMesh® standard, and the access point is an agent of the Wi-Fi EasyMesh® and the controller apparatus is a controller of the Wi-Fi EasyMesh®.

17. The access point apparatus according to claim 16, wherein the one or more access point apparatuses include an access point apparatus that functions as the controller apparatus.

18. The access point apparatus according to claim 1, further comprising a steering control unit configured to control steering processing such that, before firmware of one access point apparatus is updated, a station connecting to the one access point apparatus connects to another access point apparatus different from the one access point apparatus.

* * * * *